(12) United States Patent
De Piero et al.

(10) Patent No.: US 10,724,750 B2
(45) Date of Patent: Jul. 28, 2020

(54) COOLING DRYER FOR COMPRESSED AIR AND CORRESPONDING METHOD

(71) Applicant: Officine Meccaniche Industriali S.R.L. Con Unico Socio, Fogliano Redipuglia (IT)

(72) Inventors: Paolo De Piero, Tavagnacco (IT); Stefano Vezil, Trieste (IT); Giovanni Battista Capellari, Undine (IT)

(73) Assignee: Officine Meccaniche Industriali S.R.L. Con Unico Socio, Fogliano Redipuglia (IT)

( * ) Notice: Subject to any disclaimer, the term of this patent is extended or adjusted under 35 U.S.C. 154(b) by 481 days.

(21) Appl. No.: 15/361,787

(22) Filed: Nov. 28, 2016

(65) Prior Publication Data

US 2017/0074528 A1    Mar. 16, 2017

Related U.S. Application Data

(63) Continuation of application No. PCT/IB2015/052616, filed on Apr. 10, 2015.

(30) Foreign Application Priority Data

May 29, 2014 (IT) .............................. UD2014A0089

(51) Int. Cl.
| | | |
|---|---|---|
| B01D 53/26 | (2006.01) | |
| F24F 3/14 | (2006.01) | |
| F25D 21/12 | (2006.01) | |

(52) U.S. Cl.
CPC .......... F24F 3/1405 (2013.01); B01D 53/265 (2013.01); F25D 21/12 (2013.01); *B01D 2256/10* (2013.01); *B01D 2256/18* (2013.01)

(58) Field of Classification Search
CPC ....... F24F 3/1405; B01D 53/265; F25D 21/12
See application file for complete search history.

(56) References Cited

U.S. PATENT DOCUMENTS

| | | |
|---|---|---|
| 4,976,116 A | 12/1990 | Hayama et al. |
| 5,119,640 A | 6/1992 | Conrad |
| (Continued) | | |

FOREIGN PATENT DOCUMENTS

| | | |
|---|---|---|
| CN | 1713950 A | 12/2005 |
| CN | 201342314 Y | 11/2009 |
| (Continued) | | |

OTHER PUBLICATIONS

Chinese Search Report, China Patent Application No. 201580035524.7, dated Nov. 8, 2018, 3 pages, with English language translation.

(Continued)

*Primary Examiner* — Elizabeth J Martin
*Assistant Examiner* — Nael N Babaa
(74) *Attorney, Agent, or Firm* — Taft Stettinius & Hollister LLP

(57) ABSTRACT

Dryer for compressed air including at least one cooling unit (28), able to cool a refrigerant fluid circulating in at least one drying unit (22), provided with an air inlet (11) and an air outlet (13) and also comprising at least one circuit (18) inside which air to be treated circulates from said air inlet (11) to said air outlet (13). The dryer for compressed air comprises, along the circuit (18), at least one cooling apparatus (12), configured to cool the compressed air to positive temperatures, a few degrees above zero and near to freezing temperature, and at least one freezing apparatus (14), disposed downstream of the cooling apparatus (12) and configured to cool the compressed air to abundantly negative values.

9 Claims, 4 Drawing Sheets

(56) References Cited

U.S. PATENT DOCUMENTS

| | | | |
|---|---|---|---|
| 5,428,963 A | 7/1995 | Korycki et al. | |
| 5,664,426 A | 9/1997 | Lu | |
| 5,865,033 A * | 2/1999 | Gossler | B01D 53/265 62/278 |
| 2004/0045440 A1 | 3/2004 | Baseen et al. | |
| 2004/0194494 A1 * | 10/2004 | Wilkinson | F25D 17/005 62/407 |
| 2010/0180630 A1 * | 7/2010 | Ogawa | F25B 41/04 62/498 |
| 2012/0042691 A1 * | 2/2012 | Krumbholz | B01D 53/002 62/617 |

FOREIGN PATENT DOCUMENTS

| | | |
|---|---|---|
| CN | 101839653 A | 9/2010 |
| CN | 203342632 U | 12/2013 |

OTHER PUBLICATIONS

Chinese Office Action, China Patent Application No. 201580035524.7, dated Nov. 8, 2018, 6 pages, with English language translation.
International Search Report and Written Opinion of PCT/IB2015/052616, dated Jun. 29, 2016, 12 pages.

* cited by examiner

COOLING DRYER FOR COMPRESSED AIR AND CORRESPONDING METHOD

FIELD OF THE INVENTION

The present invention concerns a dryer for compressed air and the corresponding method, able to be used in applications in which dehumidified compressed air must be available, such as, by way of example, in the pharmaceutical, food or other industry.

The present invention can also be applied to dry and remove humidity from technical gases, such as, for example, but not only, nitrogen, helium and others.

In particular, the humidity can be removed by the progressive cooling of the compressed air so as to obtain an abundantly negative dew point temperature, corresponding to a very high degree of dehumidification.

BACKGROUND OF THE INVENTION

The need is known, in numerous sectors such as, for example, the pharmaceutical and food sectors, to have compressed air or technical gases too, with a high quality level, which, in general, cannot be obtained by directly using a stream of ambient air which has been previously compressed.

It is therefore necessary to perform some operations to purify the air, with the main objective of eliminating humidity, thus obtaining substantially dry compressed air, that is, almost completely without humidity.

Generally, the humidity is removed by dehumidification operations, to make available a stream of compressed air that is re-usable depending on the specific field of application.

Currently, in the field of dehumidification processes for compressed air, (which, due to conceptual and structural differences, must not be compared with systems for purifying streams of air containing noxious products such as oil, dust, percolates, etc.), different types of dryers are available, such as for example cooling dryers, adsorption dryers and hybrid types, that is, a mixture of the previous two categories, characterized by the different degrees of dehumidification obtainable.

Cooling dryers exploit the principle of humidity condensation, obtained by lowering the temperature of the compressed air in a traditional cooling cycle with a heat exchanger.

One disadvantage of this type of dryers is the presence of a lower functioning limit of the dryer, relating to the minimum dew point temperature reachable, the same as freezing temperature.

In a range of temperatures near to this, in fact, there is a risk of ice forming during the condensation of the humidity, with a possible consequent breakage of the heat exchanger due to the increase of the volume of humidity, in which the compressed air to be treated is made to circulate.

For this reason, cooling dryers are not used in applications that require dry compressed air or that has a particularly reduced humidity content, since the performance associated with them directly depends on the minimum dew point temperature obtainable.

Adsorption dryers remove the humidity by using a porous and hygroscopic material, such as for example silica gel, sifters or activated alumina, able to selectively bond with the water molecules present in the compressed air.

In this way the extraction and retention is obtained of the humidity from the stream of compressed air by physical and/or chemical processes without cooling, thus avoiding the disadvantages connected to cooling dryers.

One advantage of adsorption dryers concerns the high performance associated with them, and the possible application even in places with a cold climate, where the temperatures can be incompatible with using cooling dryers.

On the contrary, the biggest disadvantage of this type of dryer is that they need an operation to regenerate the adsorbent material because it gets progressively saturated; this can be achieved, for example, using the so-called cold regeneration technology, where part of the stream of dry air is collected at exit, generally about 15%.

Alternatively, according to the principle of hot regeneration, it is possible to regenerate the adsorbent material by using resistances and blowers, suitable to heat the adsorbent material and to determine the evaporation of the humidity bonded with the hygroscopic material.

Both solutions entail high investment and running costs (regeneration).

Another alternative is to recover the thermal stream generated during the air compression step, so as to have enough energy available to evaporate the humidity bonded with the hygroscopic material.

One disadvantage of this known solution concerns the difficulty of this application in the presence of lubricated compressors, since the lubricant itself, generally oil-based, dissipates a considerable amount of heat, reducing the overall heat stream available for regeneration.

Hybrid dryers are also known, which have only recently become widespread and which provide a first drying step through cooling, able to remove about 80-85% of the humidity, followed by a further removal of residual humidity, carried out by the adsorption technology. This method allows to considerably increase the quality level of the dry air obtainable compared with cooling dryers and, at the same time, to reduce the high running costs associated with adsorption dryers.

One disadvantage of this known solution concerns the high investment costs, since two different units are required in which to carry out the successive dehumidification steps, and also the greater running costs associated with the adsorption technology.

In the state of the art, devices are also known for purifying compressed air, which use a first air-cooling stage at a temperature higher than the freezing temperature of water, and a second cooling stage, disposed downstream and in series with the first cooling stage, in which the humidity in the compressed air is frozen and then separated from the stream. Examples of these devices are described for example in U.S. Pat. Nos. 4,976,116 and 5,428,963.

US 2012/0042691 is also known, which concerns a system to capture and recover in liquid form volatile or semi-volatile pollutant products deriving from the extraction of crude oil, to be subsequently used in non-pollutant terms. This system specifically provides to purify the stream of air of contaminants mainly consisting of hydrocarbons and it is used for underground or transportable tanks or vats for fuels. This document, in one form of embodiment, provides the combined and alternate use of two circuits, each comprising a first cooling stage with temperatures higher than the freezing temperature of water, and a second cooling stage with temperatures lower than the freezing temperature of water. The teaching of this document provides, as its main purpose, to clean the usual sources from gases arriving from storage tanks or polluted ground and which contain the gases, as well as other components, such as for example siloxanes and water.

The off gas is obtained by means of compression and condensation, possibly further treated with regenerating absorbers to remove the residual chemical vapors, after which the off gas can be re-introduced where it was extracted.

The present invention, as will be described in more detail and claimed hereafter, comes from a different field, which is the technical field of treating compressed air by cooling, in order to eliminate the water transported in the stream of air, with particular reference to the use of said compressed air in the pharmaceutical and food sectors.

In particular, one purpose of the present invention is to provide a dryer for compressed air able to work with abundantly negative dew point temperatures lower than freezing temperature, without compromising the correct functioning of the dryer.

Another purpose of the present invention is to obtain a dryer for compressed air operating with a cooling cycle, which is simple to make and able to obtain a stream of dry air with a high quality level, suitable for the most extreme applications and/or harsh climates and/or combinations thereof.

Another purpose of the present invention is to obtain a dryer connected to a distribution plant for the various user devices, which implements a method for drying compressed air able to obtain at least one partial energy recovery of the energy expended during cooling, by interchange with hot air entering and consequent heating of the dry air before it is introduced into the distribution plant for the various user devices.

Another purpose of the present invention is to obtain a dryer for compressed air that can entail lower purchase costs, running costs and energy consumption than those of both adsorption dryers and hybrid dryers of the state of the art.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the present invention or variants to the main inventive idea.

In accordance with the above purposes, the present invention concerns a dryer for compressed air, provided with an air inlet and an air outlet and at least one circuit, inside which air to be treated circulates from the air inlet to the air outlet.

In accordance with possible forms of embodiment, along said circuit the dryer comprises at least one cooling apparatus configured to cool the compressed air to temperatures near freezing, positive or negative, and at least one freezing apparatus, disposed downstream of the cooling apparatus and configured to cool the compressed air to abundantly negative values, In accordance with possible forms of embodiment, the cooling apparatus comprises at least one air-air exchanger, in which the stream of compressed air to be dehumidified and a stream of dry compressed air flow, while the freezing apparatus comprises at least one air-refrigerant exchanger, in which the stream of compressed air and a refrigerant fluid flow.

Advantageously, the dryer according to the invention works with dew point temperatures lower than freezing temperature and abundantly negative, allowing a considerably greater dehumidification of the compressed air without compromising the correct functioning of the dryer itself.

In accordance with a preferred form of execution of the present invention, the dryer comprises at least two drying units, connected to each other in sequence by means of at least one inversion element, which can be selectively activated to determine the passage of compressed air in a first drying unit, and then in a second drying unit.

In accordance with another preferred form of execution of the present invention, the compressed air dryer comprises at least two drying units in parallel and operating alternately by means of at least one valve, which can be selectively activated to determine the passage of the compressed air entering into one or the other of the drying units.

In this way, it is therefore possible to allow the defrosting regeneration operations in the part of the dryer that is not operative at that moment without losing functioning continuity.

In accordance with possible forms of embodiment, the method for drying by refrigeration according to the invention provides to activate the cooling unit to determine the cooling of the refrigerant fluid, to introduce the compressed air into the drying unit, to cool the compressed air inside the cooling apparatus, to freeze the compressed air inside at least one freezing apparatus, to make the dry compressed air pass through the cooling apparatus, to expel the dry compressed air and to regenerate the freezing apparatus.

In accordance with possible forms of embodiment, the drying method provides to perform the dehumidification of the air in a cyclical manner, by activating at least one valve, configured to allow the passage of compressed air alternately in at least two different drying units, in which in one of these the dehumidification of the compressed air is obtained and in the other the regeneration by defrosting of the frozen humidity and subsequent separation and discharge of the condensation retained therein.

In accordance with a preferred form of embodiment, the drying method provides to perform the dehumidification of the air in a cyclical manner, by activating at least one inversion element, configured to allow the passage of the air in at least two different drying units, in which in one the dehumidification of the compressed air is obtained and in the other the regeneration of the frozen humidity.

Advantageously, this drying process supplies dry compressed air continuously to the user devices, without interrupting the dehumidification process to perform the regeneration of the dryer itself, and without incurring the costs and disadvantages of known solutions.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
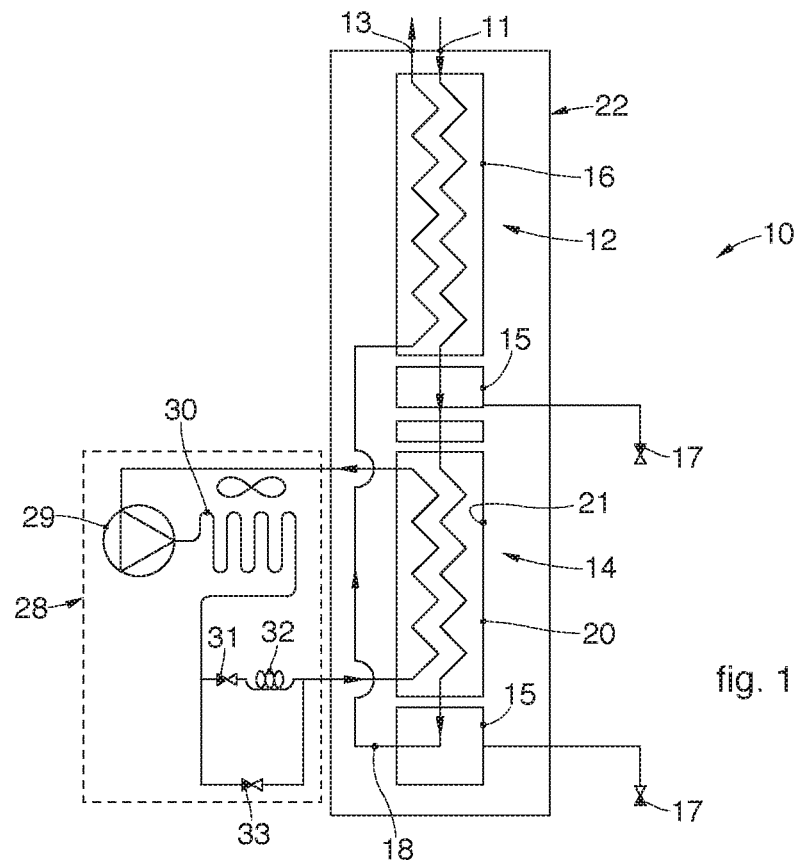
FIG. 1 schematically shows a dryer for compressed air in a first operating mode.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

In accordance with the present invention, forms of embodiment of the invention described here concern a dryer 10, and the corresponding functioning, to dehumidify compressed air or other technical gases such as, for example, but not only, nitrogen, helium and suchlike.

In particular, the dryer 10 can be used in multiple applications that require compressed air or technical gases with a reduced humidity content, as for example the pharmaceutical sector or food sector and suchlike.

The dryer 10 can comprise at least one cooling unit 28 and a drying unit 22, supplied with at least one air inlet 11 and an air outlet 13 between which at least one circuit 18 of the compressed air can be defined, able to dehumidify the air.

At least one cooling apparatus 12 can be disposed along the circuit 18, operating substantially as a refrigeration dryer as in the state of the art, and at least one freezing apparatus 14, located in series to the cooling apparatus 12 and configured to complete the process of removing the humidity.

The cooling apparatus 12 can also comprise at least one air-air exchanger 16, for example of the type which directly exchanges heat with counter-current streams, or equal-current streams or also the type with crossed streams.

In particular, the air-air exchanger 16 can be configured to guarantee the removal of most of the humidity present in the compressed air by cooling it to positive temperatures, near to the freezing temperature of humidity.

The freezing apparatus 14 can also comprise at least one air-refrigerant exchanger 20, for example of the finned type, configured to allow the residual humidity still present in the compressed air and not retained in the air-air exchanger 16 to freeze on its internal walls 21 and/or internal fins.

The cooling apparatus 12 and/or the freezing apparatus 14 can comprise at least one condensation separator 15, configured to separate the condensed humidity from the compressed air.

In particular, the condensation separator 15 can be, for example, a demister, with a cyclone or inertial impact.

Furthermore, to prevent possible drawing of the condensation toward the outside of the condensation separator 15, it can be provided with an exit, super-elevated with respect to its bottom, where condensation can accumulate.

Along the circuit 18 and downstream of the condensation separator 15 an oil separator filter 19 can be provided, configured to separate any oil present in the compressed air.

The separated humidity can later be discharged outside the dryer 10 by means of one or more condensation dischargers 17.

The condensation separator 15 and the condensation discharger 17 can be integrated, so as to form a single device that, at the same time, can separate the humidity from the compressed air and discharge it outside the dryer 10.

The humidity can be separated directly inside the exchangers 16 and 20, exploiting the accumulation thereof due to gravity and/or the presence of partitions in the lower portion, without needing the condensation separator 15.

Figure 2:
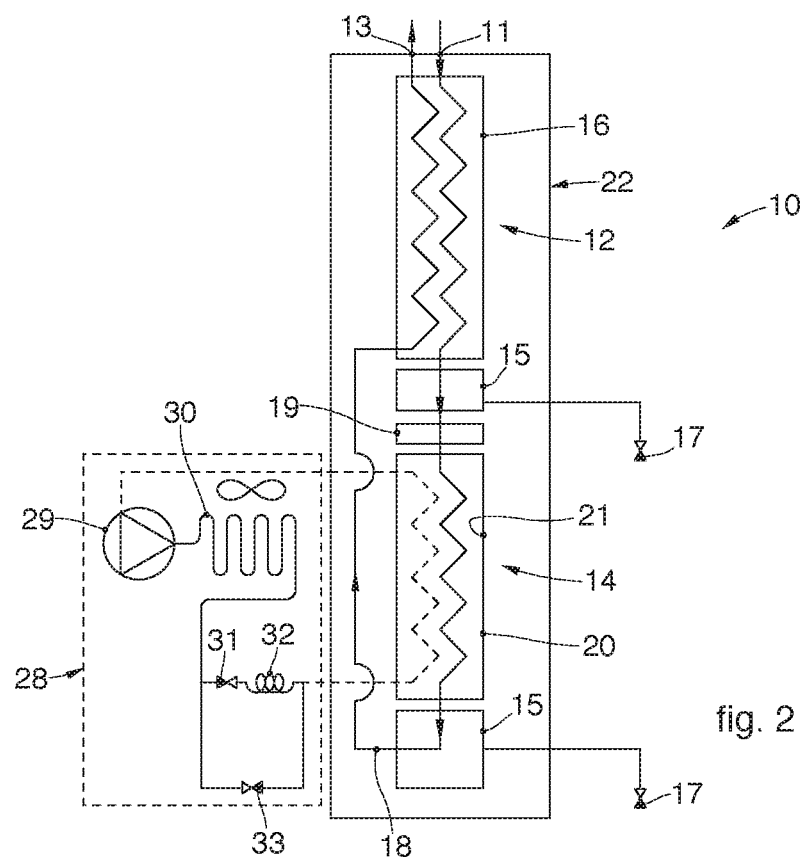
FIG. 2 schematically shows the dryer for compressed air of FIG. 1 in a second operating mode.

In some forms of embodiment, the dryer 10 can function cyclically, alternating between a freezing operating mode (FIG. 1) and a defrosting operating mode (FIG. 2).

In the freezing operating mode, the compressed air, produced in a unit not shown in the attached drawings, travels through the circuit 18 and can pass through the air-air exchanger 16 where it can give up heat to a stream of dry compressed air.

In this way, the heat exchange can allow a progressive reduction in the temperature of the compressed air, allowing most of the humidity present to condense.

The compressed air can therefore pass from a high entrance temperature, for example about 35°, to a defined dew point temperature at exit, near to freezing temperature comprised between about −2° C. and about +5° C., for example about 3° C.

At exit from the air-air exchanger 16, the compressed air can have a reduced humidity content of about 80-90%, for example corresponding to a quantity less than 1 g/Nm$^3$, in particular about 0.7 g/Nm$^3$, incompatible with many of the applications described above.

For this reason, the freezing apparatus 14 can be located in series with the first cooling apparatus 12, and configured to further reduce the humidity content of the compressed air.

In forms of embodiment described here, the air-refrigerant exchanger 20 can be configured to take the dew point temperature to negative values, for example comprised between about −40° C. and about −10° C., in particular about −20° C., corresponding to a quantity of less than about 0.01 g/Nm$^3$.

In this way, the air-refrigerant exchanger 20 can allow, by further cooling, to freeze the residual humidity in correspondence with its internal walls 21.

In particular, the residual humidity can be frozen for example by means of a refrigerant fluid, the temperature of which can be defined and regulated by the cooling unit 28.

The cooling unit 28 can comprise at least one compressor 29 of the refrigerant fluid, a condenser 30, a lamination control valve 31 and a lamination member 32.

The cooling unit 28 can also comprise a hot gas valve 33, configured to allow to introduce hot gas inside the freezing apparatus (evaporator) 14 and to defrost the humidity accumulated on its walls.

In some forms of embodiment of the present invention, the cooling circuit can function cyclically with a heat mass, or a compressor with inverter, to allow energy saving when there is a reduced stream of compressed air present compared with nominal capacity.

Using the freezing apparatus 14 allows to considerably lower the dew point temperature to values that cannot be obtained with known cooling dryers, consequently obtaining greater dehumidification yet still maintaining a great simplicity in construction and a limited cost, lower than that associated with adsorption dryers and hybrids.

Furthermore, the geometry and sizes of the air-refrigerant exchanger 20 can be suitably defined so as not to create dangers of breakage and obstruction of the passage sections due to the increase in volume of the frozen humidity.

Finally, the dry compressed air can be sent again to the air-air exchanger 16 in order to perform the initial cooling of the compressed air, to obtain energy recovery and to lower the humidity value of the exiting air.

This energy recovery also allows to take the dry compressed air exiting from the dryer 10 to optimum conditions, compatible with direct use in the applications mentioned above, which generally require dry compressed air at a temperature near ambient temperature, for example comprised between about 20° C. and about 25° C., much greater than the temperature at exit from the air-refrigerant exchanger 20.

In fact, if this were not pre-heated, it would cause condensation of the humidity contained in the space where the compressed air is applied on the external surface of the compressed air distribution pipes.

In forms of embodiment described here, it is possible to vary the level of dehumidification obtained, in order to increase the versatility of the dryer 10, for example by varying the working temperature of the air in the air-refrigerant exchanger 20, either electronically, mechanically or manually.

In variant forms of embodiment, not shown in the attached drawings, the freezing apparatus 14 can be integrated with the cooling apparatus 12, substantially obtaining a single compact heat exchanger, configured to obtain the complete dehumidification of the compressed air.

In other variant forms of embodiment, also not shown in the attached drawings, the drying unit 22 can comprise two or more freezing apparatuses 14 in series, in order to modify the dehumidification obtainable depending on the needs, also varying, of the user devices.

After the air-refrigerant exchanger 20 has retained through freezing a determinate quantity of humidity, it is necessary to cyclically regenerate (defrost) it, to prevent the subsequent functioning entailing any breakage thereof, due to excessive thickness of the ice.

It is therefore possible to vary the functioning of the dryer 10 by passing from freezing operating mode (FIG. 1) to defrosting operating mode (FIG. 2).

In particular, said variation in the functioning of the dryer 10 can be commanded by a control unit, which can detect the quantity of ice formed in the air-refrigerant exchanger 20 and selectively de-activate the functioning of the cooling unit 28.

With reference to FIG. 2, in the defrosting mode, the high temperature compressed air, for example about 35° C., can pass through the air-air exchanger 16 and subsequently the air-refrigerant exchanger 20.

In this operating mode, the cooling fluid is not introduced into the air-refrigerant exchanger 20 by the cooling unit 28, so as to prevent the compressed air from cooling and consequently any other ice from forming.

The compressed air can therefore progressively cool, giving up to the frozen humidity enough energy for defrosting.

The humidity can then be removed from the dryer 10 by the condensation separators 15 and condensation dischargers 17 described above, in order to restore the optimum initial conditions for functioning in freezing mode.

In this way, it is also possible to obtain compressed air to be treated at a lower temperature, consequently reducing energy consumption associated with the dehumidification thereof during the successive functioning in freezing operating mode.

In some forms of embodiment of the present invention, to prevent the freezing of the condensation flowing in the condensation dischargers 17, which are subject to negative temperatures, it is possible to provide an electrical type resistance, configured to heat the condensation dischargers 17 and prevent the formation of ice in them.

In other forms of embodiment of the present invention, the air-refrigerant exchanger 20 can be defrosted by making flow inside it dry compressed air previously obtained, or alternatively, by injecting a hot gas by activating the hot gas valve 33.

Figure 3:
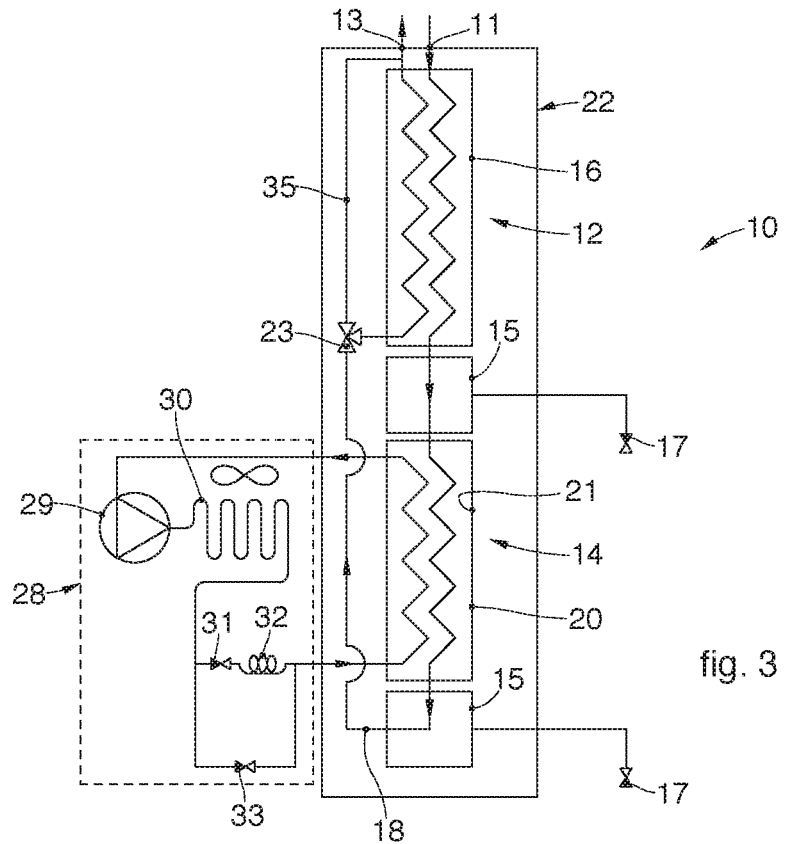
FIG. 3 schematically shows a variant of the dryer for compressed air of FIG. 1.

In variant forms of embodiment described with reference to FIG. 3, the drying unit 22 can also comprise, along the circuit 18 and downstream of the freezing apparatus 14, a deflector element 23, configured to selectively associate the circuit 18 with a by-pass circuit 35.

The deflector element 23 can therefore selectively determine the passage of all, none or part of the air inside the air-air exchanger 16, after it has passed through the freezing apparatus 14.

In this way it is possible to send to the air-air exchanger 16, for example advantageously during the freezing operating mode, only a partial quantity of dry compressed air in order to keep constant, at about 3° C., the temperature of the air exiting from the air-air exchanger 16 and entering the air-refrigerant exchanger 20.

The deflector element 23 can be any known type, for example a three-way valve or an electro valve, the functioning of which can be commanded by the control unit described above.

In preferred forms of embodiment of the present invention described here, to prevent interrupting the dehumidification process to defrost the frozen humidity, the dryer 10 can comprise at least two drying units 22', 22".

Figure 4:
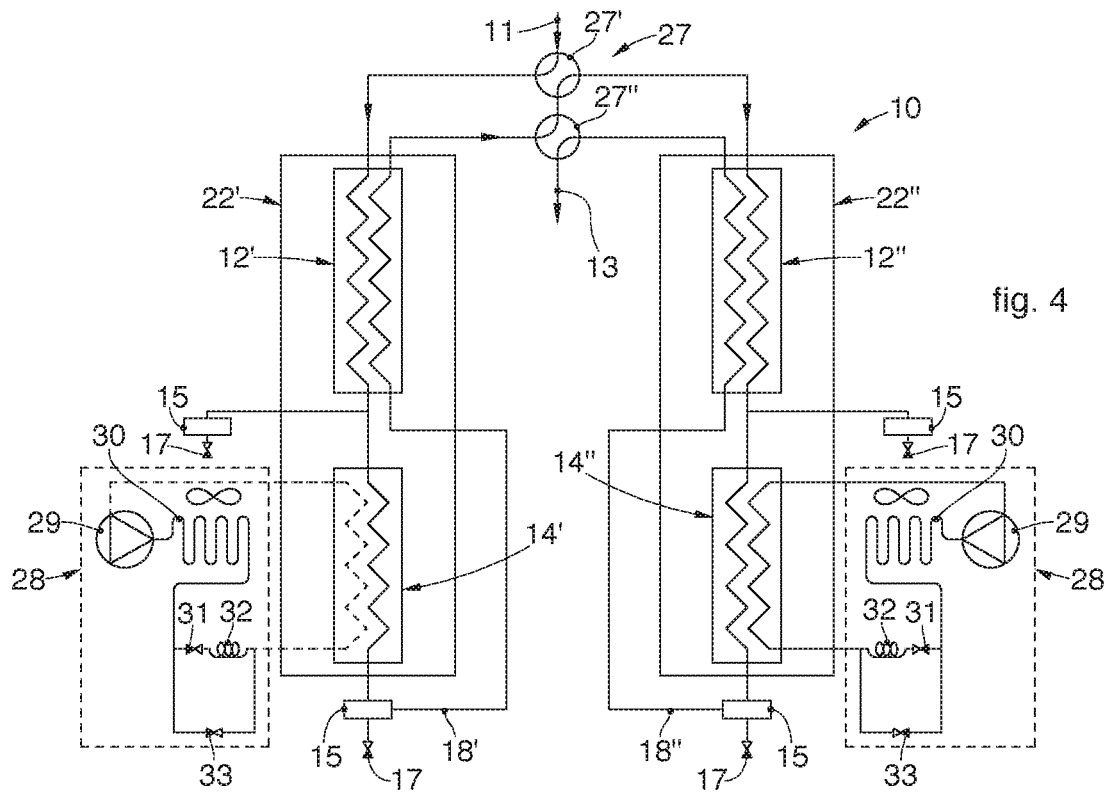
FIG. 4 schematically shows a dryer with cyclical and continuous functioning in accordance with the present invention.
Figure 5:
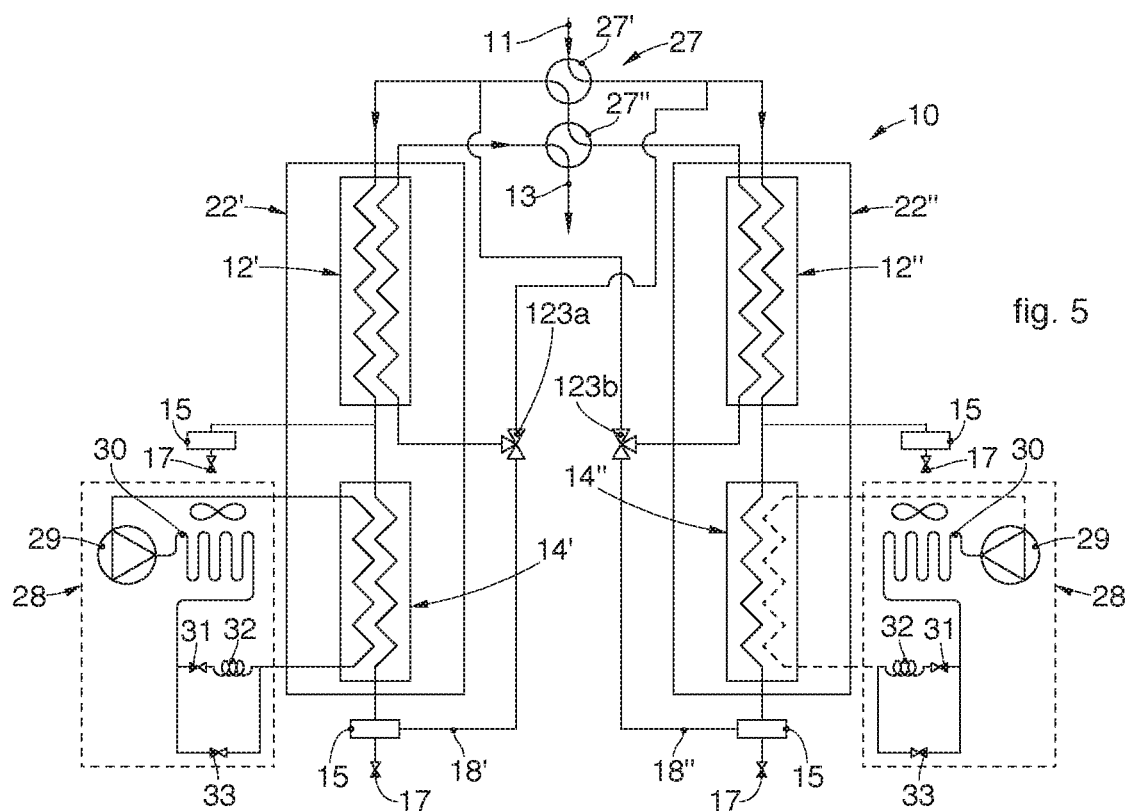
FIG. 5 schematically shows the dryer of FIG. 4 in another operating mode.

Each of the drying units 22', 22" can be supplied with a respective cooling unit 28, in the case of FIGS. 4 and 5, two cooling units 28', 28".

Alternatively, it is possible to provide a single cooling unit 28 (FIG. 6) which sends the cooling fluid alternately to each of the drying units 22', 22", thanks to the activation of one of the lamination valves 31 depending on the operating mode—freezing or defrosting—of each of the drying units 22', 22".

In forms of embodiment described here with reference to FIGS. 4 and 5 for example, the at least two drying units 22', 22" can be connected to each other in series by means of at least one inversion element 27 to invert the travel of the compressed air, in this case two inversion elements 27', 27".

In forms of embodiment described here, the at least one inversion element 27 can be a valve, for example a three-way or four-way valve, an electro valve or a spool valve.

In some forms of embodiment of the present invention, not shown in the attached drawings, the four-way valves can be mounted on a single driver, in order to create an eight-way valve able to assume at least two positions, thus considerably simplifying construction.

In forms of embodiment described here, the functioning of the inversion element 27 can be selectively commanded by the control unit, for example according to a predetermined duration of each cycle, for example 15 minutes freezing and 15 minutes defrosting for each drying unit 22' and 22".

In other variant forms of embodiment, the inversion element 27 can be driven by monitoring at least one operating parameter of the drying units 22', 22", by sensors and/or probes, not shown in the attached drawings.

For example, the sensors and/or probes can be configured to detect the dew point temperature of the compressed air and/or the fall in pressure measured at different points of the dryer 10, for example, but not restrictively, between the inlet and outlet of the air-refrigerant exchanger 20.

Consequently, when the control unit detects that predetermined values of the previous parameters have been reached, it can modify the position of the at least one inversion element 27, and therefore also the direction in which the compressed air passes inside the drying units 22' and 22".

With reference to FIG. 4, the compressed air is sent by the first inversion element 27' into the first drying unit 22' in defrosting operating mode, while the second drying unit 22" can have a freezing operating mode.

The hot compressed air can then pass through a first circuit 18', in succession through a first cooling apparatus 12' and a first freezing apparatus 14' of the first drying unit 22', progressively cooling and giving up part of its heat to the humidity that has frozen in the previous cycle, which can defreeze and be discharged outside the dryer 10.

Subsequently, the compressed air can again pass through the first cooling apparatus 12', to then be sent to the second drying unit 22" by the inversion elements 27' and 27".

The compressed air can then pass through a second cooling apparatus 12" and a second freezing apparatus 14", disposed along a second circuit 18" of the second drying unit 22", thus obtaining, in a travel that is specular to the one made in the first drying unit 22', the desired dehumidification using the modes described above.

When the control unit detects that a maximum allowed threshold value of at least one of the previous operating parameters of the second drying unit 22" has been exceeded, it can modify the position of the inversion elements 27' and 27", so as to invert the previous cycle (FIG. 5).

In this way, the compressed air can first pass through the second drying unit 22", in defrosting operating mode, and then the first drying unit 22', in freezing operative mode, thus obtaining a cyclical and continuous process to dehumidify the compressed air.

According to a variant, the inversion of the first and second drying units 22', 22" is managed by the presence of respective temperature probes (not shown), advantageously located at a cold point of the freezing apparatuses 14', 14" which, when a predetermined limit temperature has been reached, activate said inversion.

In the variant shown in FIG. 5, every drying unit is provided with its own deflector element 123a, 123b which, when selectively activated, can thus selectively determine the passage of at least part of the air inside the respective air-air exchanger 16, after it has passed through the respective freezing apparatus 14', 14".

The selective drive, for example, of the deflector element 123b, in the solution shown in FIG. 5, allows to divert part or all the stream of dehumidified air arriving from the freezing apparatus 14" directly inside the air-air exchanger of the cooling apparatus 12' in the circuit 18'. Then, the passage of the stream of cold air in the air-air exchanger of the cooling apparatus 12" of the circuit 18" is partly or completely by-passed.

The solution of providing the deflector elements 123' and 123" allows to maximize the heat exchange, in this case, in the cooling apparatus 12', in that the air directly exiting from the freezing apparatus 14", and therefore with the minimum possible temperature, is sent to the cooling apparatus 12', thus increasing the cooling efficiency.

The selective activation of the deflector elements 123' and 123" therefore allows to position one or both of them in at least three operating positions.

In a first condition, or inactive condition, they allow the whole stream of air exiting from a freezing apparatus 14', 14" to enter into the respective cooling apparatus 12', 12" of the same drying unit 22', 22" to perform heat exchange with the entering stream of air.

In a second, active condition, one or both the deflector elements 123', 123" can divert the whole stream of air exiting from a freezing apparatus 14', 14" into the cooling apparatus 12", 12' of the other drying unit 22', 22".

In a third, active condition, one or both the deflector elements 123', 123" can be positioned in an intermediate position where they divert part of the stream of air exiting from a freezing apparatus 14', 14" into the respective cooling apparatus 12', 12" of the same drying unit 22', 22", and part into the cooling apparatus 12", 12' of the other drying unit 22', 22".

The selective activation of the deflector elements 123a and 123b can be timed, programmed or influenced by parameters detected during functioning, for example by the delivery rate of the stream of air, the temperature of the entering streams, the heat exchange conditions and so on.

Figure 6:
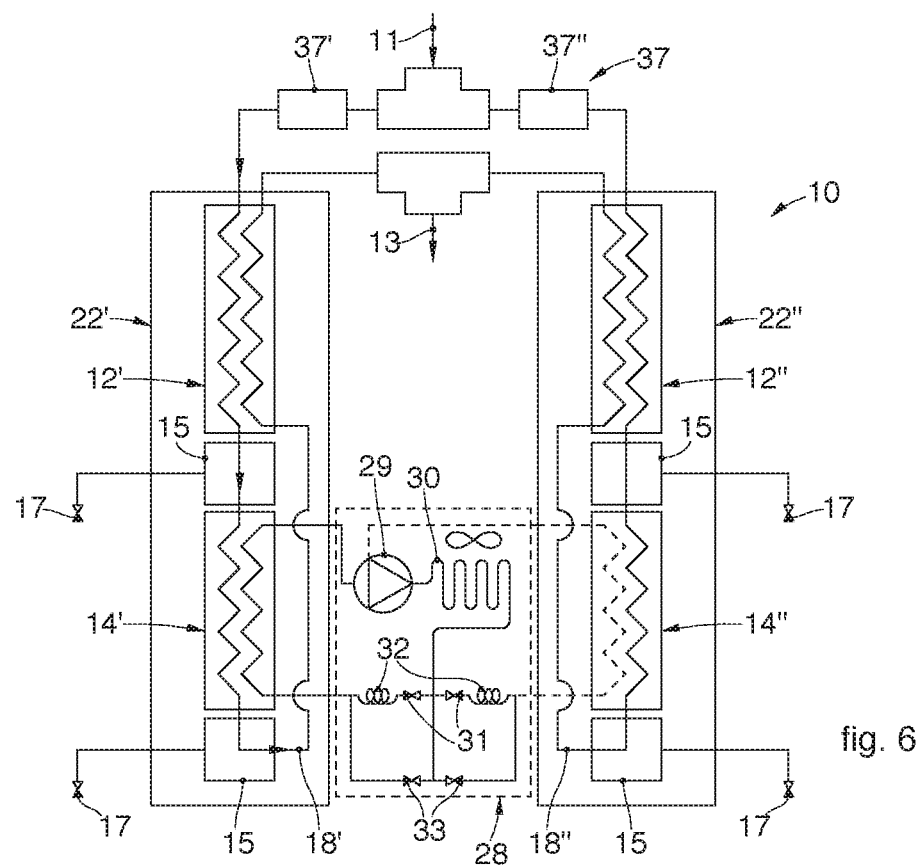
FIG. 6 shows a variant of the dryer of FIG. 5.

In other forms of embodiment, described for example with reference to FIG. 6, the at least two drying units 22' and 22" can be connected to each other in parallel.

In this case, the dryer 10 can comprise at least one valve 37, in the case of FIG. 6 two valves 37' and 37", configured to selectively direct the compressed air into one or the other drying unit 22' and 22".

With reference to FIG. 6, the compressed air can be sent to the first drying unit 22', where it can be subjected to dehumidification for the subsequent reduction in temperature as described above.

Subsequently, when the quantity of ice formed in the freezing apparatus 14' could damage or break it, the first valve 37' can be de-activated, for example by the control unit, and at the same time the second valve 37" can be activated.

Then, the entering compressed air can be sent to the second drying unit 22", while the first drying unit 22' can be subjected to the defrosting process, according to one of the modes described above.

Although not specifically illustrated, in this case too the deflector elements 123a, 123b can be present at exit from the respective freezing apparatuses 14', 14".

In variant forms of embodiment of the present invention, not shown in the attached drawings, when there are delivery peaks of compressed air present at inlet, it is possible to drive both the valves 37' and 37", so that the compressed air can pass through both drying units 22' and 22" at the same time, operating in the freezing operating mode, consequently increasing the overall cooling capacity of the dryer 10.

Figure 7:
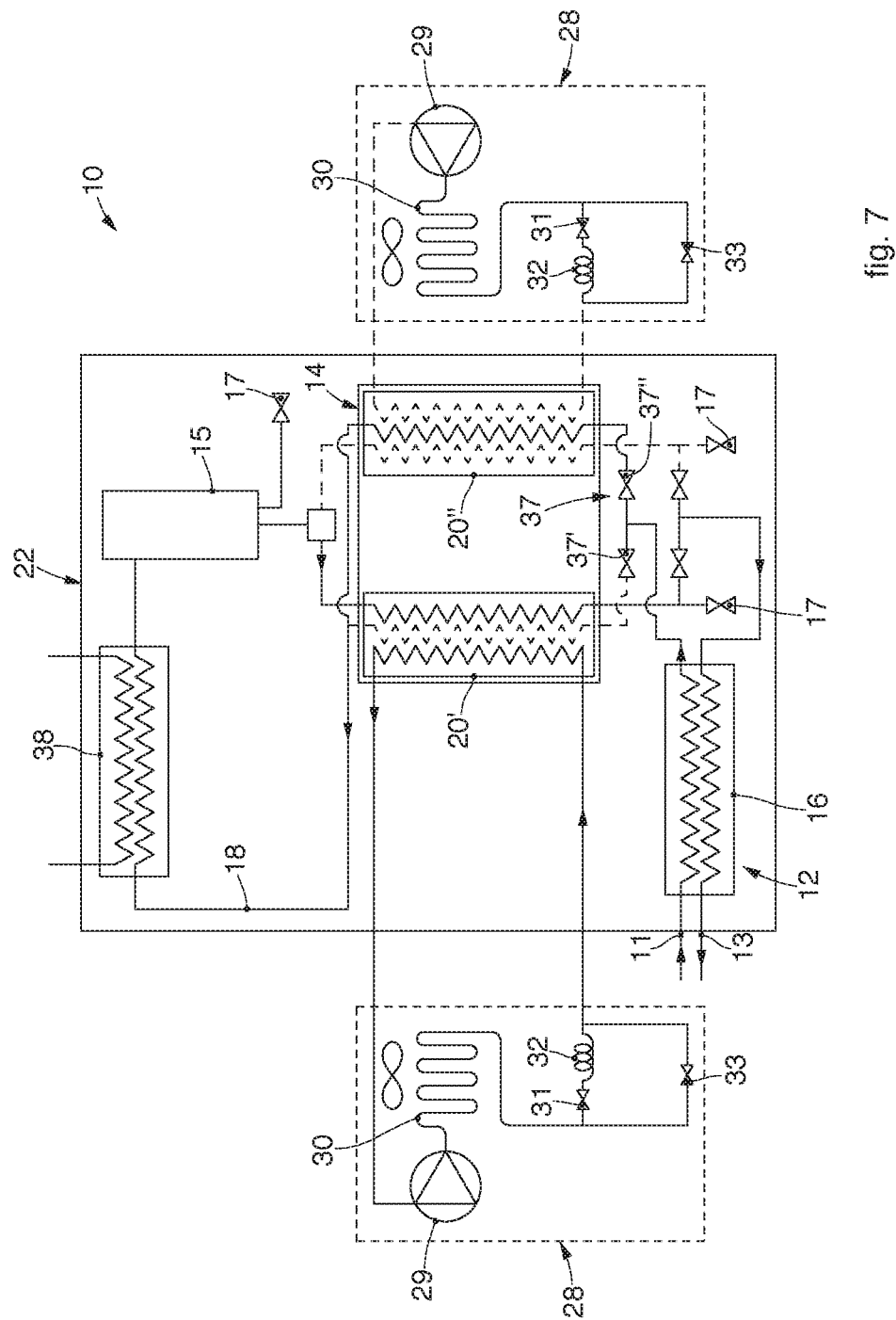
FIG. 7 shows another variant of the dryer of FIG. 1.

In other variant forms of embodiment, described for example with reference to FIG. 7, the freezing apparatus 14 of the drying unit 22 comprises at least two air-refrigerant exchangers 20' and 20", disposed in parallel to each other and functioning alternately in freezing operating mode, and at least one evaporator 38, disposed downstream of the two air-refrigerant exchangers 20' and 20" and serving a cooling circuit with a positive expansion temperature, close to 0° C. so as to prevent ice from forming.

With this configuration it is possible to keep the temperature at entrance to the freezing apparatus 14 constant, and about equal to freezing temperature, for example about 2° C., thus avoiding altering the functioning thereof with regard to possible variations in temperature of the entering air and making it simpler to control the dryer 10.

It is clear that modifications and/or additions of parts may be made to the dryer for compressed air as described heretofore, without departing from the field and scope of the present invention.

The invention claimed is:

1. A dryer for compressed air including an air inlet and an air outlet, two drying units, and a drying flowpath having two respective configurations, inside which air to be treated circulates from said air inlet to said air outlet, a first of said drying units comprising a first cooling apparatus, configured to cool the compressed air to a temperature above a freezing temperature, and a first freezing apparatus, disposed downstream of said first cooling apparatus and configured to cool the compressed air to a temperature below a freezing temperature, a second of said drying units comprising a second cooling apparatus and a second freezing apparatus, each of said freezing apparatuses having a freezing operating condition and a defrosting operating condition, wherein
a first segment of the drying flowpath, passing through said first, cooling apparatus and said first freezing apparatus, comprises at least one return segment through which the air exiting from said first freezing apparatus flows in an opposite direction in said first cooling apparatus and/or in said second cooling apparatus in order to generate a lowering of temperature in the air entering into said first cooling apparatus and/or into said second cooling apparatus;
a second segment of the drying flowpath, passing through said second cooling apparatus and said second freezing apparatus, comprises at least one return segment through which the air exiting from said second freezing apparatus flows in an opposite direction in said second cooling apparatus and/or in said first cooling apparatus in order to generate a lowering of temperature in the air entering into said second cooling apparatus and/or into said first cooling apparatus;
wherein said first and second segments of the drying flowpath are connected to each other by at least one valve;
wherein said at least one valve has at least one first operating condition in which the stream of compressed air entering is sent first along said first segment of the drying flowpath through said first cooling apparatus and said first freezing apparatus put in the defrosting condition, and then along said second cooling apparatus and said second freezing apparatus put in the freezing condition;
and a second operating condition in which the stream of compressed air entering is sent first along said second segment of the drying flowpath through said second cooling apparatus and said second freezing apparatus put in the defrosting condition, and then along said first cooling apparatus and said first freezing apparatus put in the freezing condition;
wherein said first drying unit and/or said second drying unit comprise, along said drying flowpath and downstream of the respective freezing apparatus, at least one deflector element having a passage structured to convey at least a portion of the compressed air, the at least one deflector configured to be activated to choke the passage to alter the flow of the compressed air to be sent into one and/or the other cooling apparatus.

2. The dryer for compressed air as claim 1, wherein said deflector element has a first non-active condition to allow the whole stream of air exiting from one freezing apparatus to enter into the respective cooling apparatus of the same drying unit, in order to carry out a heat exchange with the entering stream of air, a second active condition to divert the whole stream of air exiting from one freezing apparatus into the cooling apparatus of the other drying unit and a third active condition to an intermediate position, diverting part of the stream of air exiting from one freezing apparatus into the respective cooling apparatus of the same drying unit and part into the cooling apparatus of the other drying unit.

3. The dryer for compressed air as in claim 1, wherein each of said freezing apparatuses comprises two air-refrigerant exchangers, disposed in parallel to each other and functioning alternately, and at least one evaporator, disposed downstream of the two air-refrigerant exchangers along said drying flowpath.

4. The dryer for compressed air as in claim 1, wherein said two drying units are connected to each other in parallel and operating alternately by means of at least one valve, configured to selectively determine the passage of the compressed air entering into one or the other of the drying units.

5. The dryer for compressed air as in claim 1, wherein each of said freezing apparatuses comprises two air-refrigerant exchangers, disposed in parallel to each other and functioning alternately, and at least one evaporator, disposed downstream of the two air-refrigerant exchangers along said drying flowpath.

6. The dryer for compressed air as in claim 2, wherein each of said freezing apparatuses comprises two air-refrigerant exchangers, disposed in parallel to each other and functioning alternately, and at least one evaporator, disposed downstream of the two air-refrigerant exchangers along said drying flowpath.

7. The dryer for compressed air as in claim 1, wherein said two drying unit are connected to each other in parallel and operating alternately by means of at least one valve, configured to selectively determine the passage of the compressed air entering into one or the other of the drying units.

8. The dryer for compressed air as in claim 2 wherein said two drying units are connected to each other in parallel and operating alternately by means of at least one valve, configured to selectively determine the passage of the compressed air entering into one or the other of the drying units.

9. The dryer for compressed air as in claim 3, herein said two drying units are connected to each other in parallel and operating alternately by means of at least one valve, configured to selectively determine the passage of the compressed air entering into one or the other of the drying units.

* * * * *